F. H. DANIELS.
METHOD OF ANNEALING FLATS AND OTHER SHAPES.
APPLICATION FILED DEC. 8, 1908.
943,392.
Patented Dec. 14, 1909.
3 SHEETS—SHEET 1.
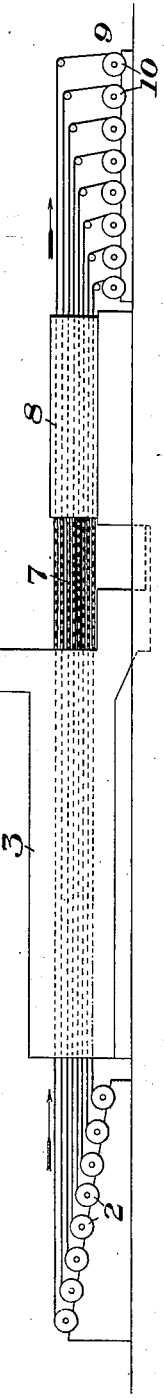
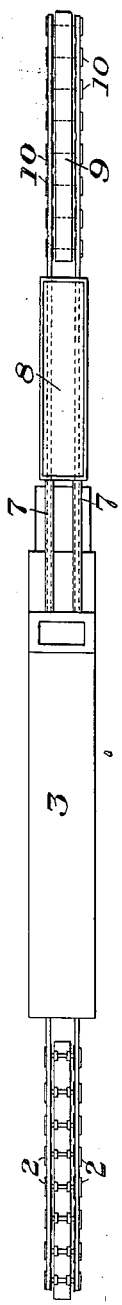

F. H. DANIELS.
METHOD OF ANNEALING FLATS AND OTHER SHAPES.
APPLICATION FILED DEC. 8, 1908.

943,392.

Patented Dec. 14, 1909.
3 SHEETS—SHEET 2.

WITNESSES
R. A. Balderson
G. B. Bleming

INVENTOR
F. H. Daniels,
by Bakewell, Byrnes & Parmelee,
his Attys.

F. H. DANIELS.
METHOD OF ANNEALING FLATS AND OTHER SHAPES.
APPLICATION FILED DEC. 8, 1908.

943,392.

Patented Dec. 14, 1909.

3 SHEETS—SHEET 3.

WITNESSES
R H Balderson
J. B. Blaming

INVENTOR
F. H. Daniels,
by Bakewell, Byrnes & Parmelee,
his Attys.

UNITED STATES PATENT OFFICE.

FRED H. DANIELS, OF WORCESTER, MASSACHUSETTS.

METHOD OF ANNEALING FLATS AND OTHER SHAPES.

943,392.  Specification of Letters Patent.  Patented Dec. 14, 1909.

Application filed December 8, 1908. Serial No. 466,471.

To all whom it may concern:

Be it known that I, FRED H. DANIELS, of Worcester, in the county of Worcester and State of Massachusetts, have invented a new and useful Improvement in Methods of Annealing Flats and other Shapes, of which the following is a full, clear, and exact description, reference being had to the accompanying drawings, forming part of this specification, in which—

Figure 3:
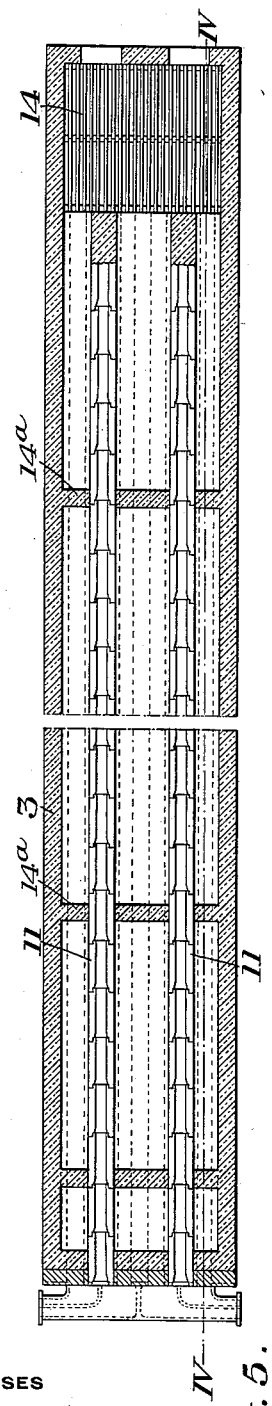
Figure 4:
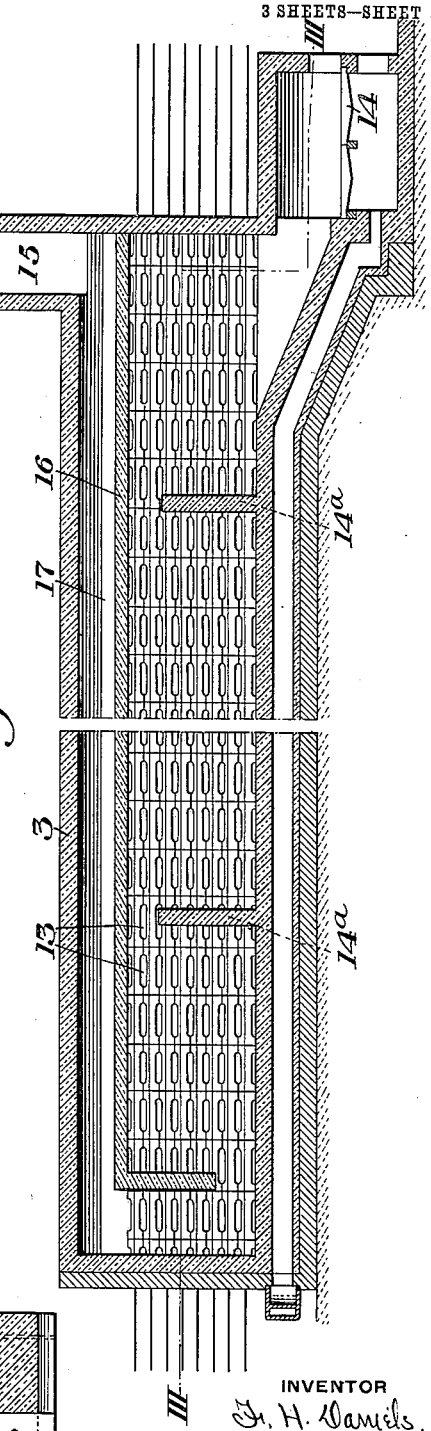
Figure 5:
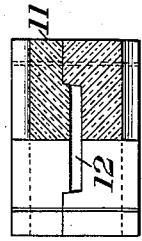
Figure 6:
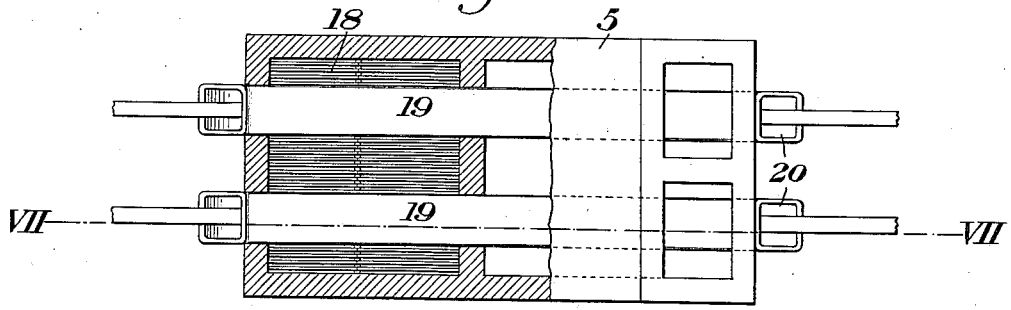
Figure 7:
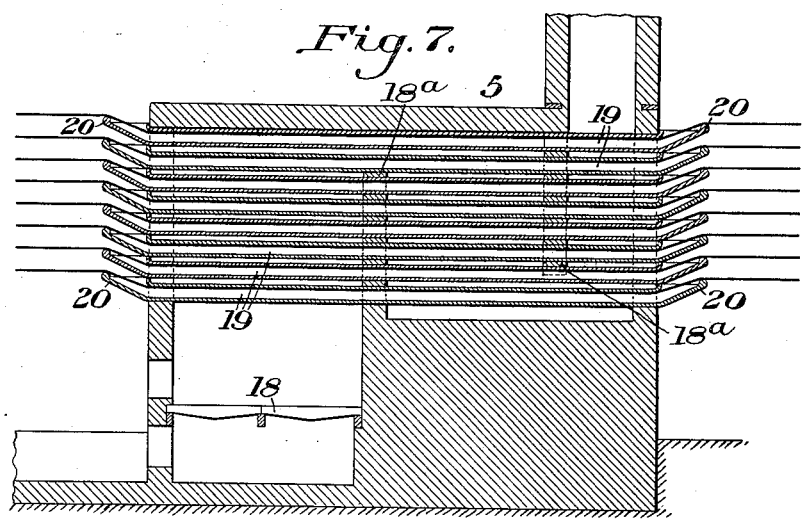
Figure 8:

Figure 1 is a side view showing diagrammatically one form of apparatus embodying my invention; Fig. 2 is a plan view of the same; Fig. 3 is a horizontal section of one form of furnace; Fig. 4 is a vertical section of the same; Fig. 5 is a detail view showing one of the sectional bricks; Figs. 6 and 7 are sectional views showing another form of annealing apparatus; and Fig. 8 is a longitudinal sectional view showing still another form of annealing apparatus.

My invention has relation to improvements in annealing flats and other metal shapes and is especially applicable to shapes of long length and of various widths, and is designed to provide a continuous process, together with apparatus for carrying out the same which will insure a uniform grade of material both physically and chemically. For round wire or narrow flats common muffle or pot annealing is more or less satisfactory in its results, as the heat penetrates comparatively quickly through the coils. The wider, however, the section is, the longer it will take for the heat to penetrate the closely wound bundle, and when it cools off, the outer portions will cool much more quickly than the inner portions, all these conditions prevent obtaining uniform grade of the product.

My invention is designed to provide a method by which the flats or other sections may be subjected to a uniform heating and cooling action throughout, thereby insuring a uniform texture and hardness.

In accordance with my invention, the flats when rolled in a rolling mill are reeled up into close bundles. These bundles are afterward placed on an unreeling apparatus, such as indicated at 2 in Figs. 1 and 2, and the unreeled flats are led therefrom through an annealing furnace, such as shown at 3 in Figs. 1, 2, 3 and 4, or through a lead annealing furnace, such as shown at 5 in Figs. 6 and 7, or at 6 in Fig. 8, or they may be first passed through a furnace, such as 3, and afterward passed through a lead annealing furnace, such as shown at 5 or 6 in Figs. 6, 7 and 8. After passing out of the annealing furnace, or furnaces, the flats are gradually cooled without coming into contact with the outer air. For this purpose, they are first passed through protecting pipes or tubes 7, and then through a receptacle 8, containing layers of coke, coal or charcoal, which prevents oxidation by excluding air. The hot metal passing through this carbonaceous material, forms a non-oxidizing gas which protects the metal. The flats are then wound up on a suitable take-up frame 9, having reeling or coiling drums 10, upon which they are wound.

In particular arrangement of apparatus shown in the drawings, provision is made for simultaneously annealing sixteen different flats, there being two sets of the unreeling rollers 2, arranged side by side, and each set containing eight rollers in successively lower planes, as shown in Fig. 1. The take-up frame 9 is provided with a similar number of the coiling or take-up rollers 10.

The furnace 3 is shown as having two parallel series of bricks 11, each of which is made in two sections, as shown in Fig. 5, with a space 12 between the sections for the flat to pass through. The bricks are also thicker at their ends than at their intermediate portions, as shown in Fig. 4, so as to provide the lateral spaces or openings 13. Any desired number of these openings may be filled up with brick or other material, so as to properly distribute the heat where it is wanted or they may be all left open. The furnace is provided with a fire grate 14, at one end, the fire being led from the grate around the rows of bricks and baffle walls 14[a], and then back up over the rows of bricks to the chimney or stack 15, a suitable longitudinal baffle 16 being provided to form the upper flue 17, leading to the stack.

The lead annealing furnace shown in Figs. 6 and 7 consists of a furnace having a grate 18 and baffle walls 18[a], with a plurality of open end receptacles 19, extending longitudinally through the heating chamber, one above the other and in two series. The ends of these receptacles are turned upwardly, as shown at 20, above the level of the lead bath contained therein, it being understood that there is one of these receptacles for each of the flats being annealed. In the modification shown in Fig. 8, the flats are passed downwardly through suitable guides 21, into a lead-containing receptacle, thence through the same and upwardly, and out through the guides 22. The receptacle is heated by being placed over any suitable furnace.

As above stated, it may, in some cases, be advisable to carry the flats first through a furnace, such as shown in Figs. 3 and 4, and subsequently through a lead-annealing furnace, such as shown in Figs. 6 and 7, or Fig. 8, after which the flats are passed through cooling receptacle 8, containing the coke, charcoal or other carbonaceous material.

The furnaces shown and described are heated by coal or coke, but an equal result could be obtained by furnaces heated with gas, oil or any other manner known to the arts.

The advantages of my invention result from the uniform heating and cooling of the flats, whereby uniformity in the texture and hardness of the steel is obtained. Also from the simplicity of the method which enables the process to be carried out continuously and with rapidity, it being possible to anneal a large number of flats or other sections simultaneously, thereby making possible a low manufacturing cost. It will be understood that any desired number of flats or other sections can be simultaneously annealed.

I claim:

1. The method of treating flats and the like, which consists in drawing the flat through an annealing furnace, and then into and through a cooling chamber in which the flat is gradually cooled in a carbonaceous atmosphere, the flat being drawn continuously through said furnace, and through the cooling chamber, and being protected from oxidizing influences while passing through the furnace to and through the cooling chamber; substantially as described.

2. The method of treating flats and the like, which consists in drawing the flat through an annealing furnace and thence into and through a cooling chamber in which the flat is gradually cooled in a carbonaceous atmosphere, and then winding the flat into a coil or bundle, the flat being drawn continuously through said furnace and through the cooling chamber, and being protected from oxidizing influences while passing through the furnace to and through the cooling chamber; substantially as described.

3. The method of treating flats and the like, which consists in supplying a plurality of coils or bundles of flats in different planes, simultaneously drawing said flats through an annealing furnace from which air and steam are excluded and thence into and through a cooling chamber in which the flats are gradually cooled in a non-oxidizing atmosphere, and then winding the flats into a coil or bundle, the flats being drawn continuously through said furnace, and through the cooling chamber, and being protected from oxidizing influences while passing through the furnace to and through the cooling chamber; substantially as described.

4. The method of annealing flats and the like, which consists in supporting a plurality of coils or bundles of flats in different planes, simultaneously drawing the flats from the bundles or coils through an annealing furnace in substantially parallel lines and thence through a cooling chamber in which the flats are gradually cooled in a non-oxidizing atmosphere, the flats passing through the furnace in the same vertical plane and being drawn continuously through said furnace and through the cooling chamber and are protected from oxidizing influences while passing through the furnace to and through the cooling chamber, and then passing the flats to a set of reeling devices arranged in different planes and re-reeling the flats into bundles thereon; substantially as described.

5. The method of treating flats and the like, which consists in drawing the flats through an annealing furnace from which air and steam are excluded and then into and through a cooling chamber containing a mass of carbonaceous material in which the flats are cooled in a non-oxidizing atmosphere the flats being drawn continuously through said furnace and through the cooling chamber, and being protected from oxidizing influences while passing through the furnace to and through the cooling chamber; substantially as described.

6. The method of treating flats and the like, which consists in drawing the flats through an inclosed passage in an annealing furnace, and then into and through a cooling chamber in which the flat is gradually cooled in a carbonaceous atmosphere, the flat being drawn continuously through said furnace and through the cooling chamber, and being protected from oxidizing influences while passing through the furnace to and through the cooling chamber; substantially as described.

7. The method of treating flats and the like, which consists in drawing the flats through inclosed tubes in an annealing furnace out of contact with the products of combustion air or steam, and then into and through a cooling chamber in which the flats are gradually cooled in a non-oxidizing atmosphere, the flats being drawn continuously through said furnace and through the cooling chamber and being protected from oxidizing influences while passing through the furnace to and through the cooling chamber; substantially as described.

8. The method of annealing flats and other metal sections, which consists in passing them continuously through a hot air annealing furnace, and then through closed tubes into and through a receptacle containing carbonaceous material and in which they are cooled out of contact with the air; substantially as described.

9. The method of annealing flats and other metal shapes, which consists in simultaneously passing a plurality of them through a hot air annealing furnace and then passing the flats through individual inclosed tubes to a receptacle containing carbonaceous material, and in which they are cooled out of contact with the air; substantially as described.

10. The method of annealing flats and other metal sections, which consists in unreeling the same and passing them through a hot air annealing furnace, then passing them through a lead bath and then cooling and re-reeling the same, the flats being protected from an oxidizing atmosphere during the entire annealing operation; substantially as described.

11. The method of annealing flats and other metal sections, which consists in unreeling the same and passing them through a lead bath, then passing the same through a receptacde containing a mass of carbonaceous material in which they are cooled, the flats being protected from an oxidizing atmosphere during the entire annealing operation, and then finally re-reeling the same; substantially as described.

12. The method of annealing flats and other metal sections, which consists in unreeling the same and passing them through a hot air annealing furnace, then passing them through a lead bath and then cooling and re-reeling the same, the flat being protected from the oxidizing influence of air during the entire annealing operation; substantially as described.

In testimony whereof, I have hereunto set my hand.

FRED H. DANIELS.

Witnesses:
GEORGE SILURIN,
A. F. BACKLIN.